(12) United States Patent
Masuda (10) Patent No.: US 7,508,603 B2
(45) Date of Patent: Mar. 24, 2009

(54) LENS SHIFT MECHANISM

(75) Inventor: Shigeru Masuda, Kanagawa (JP)

(73) Assignee: Sony Corporation, Tokyo (JP)

( * ) Notice: Subject to any disclaimer, the term of this patent is extended or adjusted under 35 U.S.C. 154(b) by 0 days.

(21) Appl. No.: 11/851,813

(22) Filed: Sep. 7, 2007

(65) Prior Publication Data
US 2008/0080069 A1    Apr. 3, 2008

(30) Foreign Application Priority Data
Sep. 29, 2006    (JP)    ............................. 2006-266566

(51) Int. Cl.
G02B 7/02    (2006.01)
G02B 15/14    (2006.01)
G03B 3/00    (2006.01)

(52) U.S. Cl. ...................... 359/813; 359/822; 359/694; 353/101

(58) Field of Classification Search .............. 359/813, 359/822, 694, 696, 381; 353/95, 100, 101, 353/122; 396/207; 355/50, 52, 62, 68; 352/79, 352/169, 191, 194; 348/E9.027
See application file for complete search history.

(56) References Cited

U.S. PATENT DOCUMENTS

| | | | | |
|---|---|---|---|---|
| 3,427,101 | A * | 2/1969 | Kerstein et al. | 352/79 |
| 3,486,807 | A * | 12/1969 | Pignone | 355/62 |
| 5,678,100 | A * | 10/1997 | Nakamura | 396/435 |
| 6,829,108 | B2 * | 12/2004 | Koba et al. | 359/813 |
| 6,966,657 | B2 * | 11/2005 | Van De Velde et al. | 353/101 |

FOREIGN PATENT DOCUMENTS

JP    5-40308    2/1993

* cited by examiner

*Primary Examiner*—Loha Ben
(74) *Attorney, Agent, or Firm*—Oblon, Spivak, McClelland, Maier & Neustadt, P.C.

(57) ABSTRACT

Disclosed herein is a lens shift mechanism which enables vertical movement of a lens attached to a first member by attaching the first member to a second stationary member so as to be vertically movable with respect to the second member, including: N (an integer of three or more) attachment shafts having a plurality of ball bearings and attached to the first member; and the second member bored with N longitudinal holes located at respective positions corresponding to attachment positions of the N attachment shafts on the first member, each of the N longitudinal holes having a vertical length not shorter than a vertical travel range of the first member.

5 Claims, 12 Drawing Sheets

LENS SHIFT MECHANISM

CROSS REFERENCES TO RELATED APPLICATIONS

The present invention contains subject matter related to Japanese Patent Application JP 2006-266566 filed in the Japan Patent Office on Sep. 29, 2006, the entire contents of which being incorporated herein by reference.

BACKGROUND OF THE INVENTION

1. Field of the Invention

The present invention relates generally to lens shift mechanisms and in particular to a lens shift mechanism preferably applied to a projector for digital cinema.

2. Description of the Related Art

A projector (see e.g. Japanese Patent Laid-Open No. Hei 5-040308) is provided with a lens shift mechanism which vertically moves a lens in order to adjust vertical positions of images on a screen.

The lens shift mechanism is such that a member attached with the lens (hereinafter called the lens attachment member) is mounted to a fixing member so as to be vertically movable, whereby the lens is vertically moveable. Such a vertically movable mount method has adopted a method in which a guide member is used such as an arimizo type guide, a linear guide, a ball bushing or the like and a spacer is used to adjust the anteroposterior positions of the lens. In addition, a drive method using a screw and a nut has been adopted as the method of vertically driving the lens.

SUMMARY OF THE INVENTION

However, the shift mechanism adopting such an existing method involves the following various problems, and therefore, it is inappropriate as a lens shift mechanism for the so-called digital cinema.

Since used in a movie theater, a lens for digital cinema is larger and heavier than a lens for the existing projector. Thus, merely adopting the existing mount method leads to a problem in that increased sliding friction due to the degradation of a lubricating material or to dust may make lens-shift itself impossible. In addition, even if the lens-shift can be performed, its backlash is increased. If a spacer is used to assembly adjust the anteroposterior positions of the lens, three-point adjustment is an upper limit. The entire assembly adjustment becomes difficult along with the difficulty of the adjustment by the spacer and rigidity after the assembly adjustment is reduced. If the existing drive method using a screw and a nut is adopted, a problem arises in that sliding friction allows the vertical drive to cause backlash. In addition, to realize the existing driving method, the structure, per se, of the lens shift mechanism is complicated and thus its assembly becomes difficult.

In view of the foregoing, it is desirable to provide a lens shift mechanism that is preferably applied to a projector for digital cinema.

According to an embodiment of the present invention, there is provided a lens shift mechanism which enables vertical movement of a lens attached to a first member by attaching the first member to a second stationary member so as to be vertically movable with respect thereto, including: N (an integer of three or more) attachment shafts each having a plurality of ball bearings and attached to the first member; and the second member bored with N longitudinal holes located at respective positions corresponding to attachment positions of the N attachment shafts on the first member, each of the N longitudinal holes having a vertical length not shorter than a vertical travel range of the first member; wherein the N attachment shafts are each passed through a corresponding one of the longitudinal holes in such a manner that the second member is put between the pluralities of ball bearings, whereby the first member is attached to the second member so as to be vertically movable with respect thereto.

Preferably, the attachment shaft is provided with a screw thread at an end thereof outside of the longitudinal hole and attached to the second member by the screw thread and a nut and at least one of the ball bearings can be varied in anteroposterior position by the degree of fastening the nut.

Preferably, the second member is provided with a plurality of other ball bearings, the first member is attached with a rail member so that the plurality of ball bearings of the second member can be moved vertically and restricted to move laterally, and the plurality of ball bearings of the second member can be disposed on the rail member when the first member is attached to the second member so as to be vertically movable with respect thereto.

According to another embodiment of the present invention, there is provided a lens shift method for a lens shift mechanism which enables vertical movement of a lens attached to a first member by attaching the first member to a second stationary member so as to be vertically movable with respect thereto, and which includes: N (an integer of three or more) attachment shafts each having a plurality of ball bearings and attached to the first member; and the second member bored with N longitudinal holes located at respective positions corresponding to attachment positions of the N attachment shafts on the first member, each of the N longitudinal holes having a vertical length not shorter than a vertical travel range of the first member. The method includes: passing each of the N attachment shafts through a corresponding one of the longitudinal holes; and attaching the second member so as to be put between the pluralities of ball bearings, whereby the first member is vertically moved with respect to the second member.

According to a further embodiment of the present invention, there is provided a projector which enables vertical movement of a lens attached to a first member by attaching the first member to a stationary second member so as to be vertically movable with respect thereto, including: N (an integer of three or more) attachment shafts each having a plurality of ball bearings and attached to the first member; and the second member bored with N longitudinal holes located at respective positions corresponding to attachment positions of the N attachment shafts on the first member, each of the N longitudinal holes having a vertical length not shorter than a vertical travel range of the first member. In the projector, the N attachment shafts are each passed through a corresponding one of the longitudinal holes in such a manner that the second member is put between the pluralities of ball bearings, whereby the first member is attached to the second member so as to be vertically movable with respect thereto for adjusting vertical positions of an image on a screen.

In the lens shift mechanism according to the embodiment of the present invention, the first member attached with the lens is attached to the second stationary member so as to be vertically movable with respect thereto in the following manner. The first member is attached with the N (an integer of three or more) attachment shafts each having a plurality of ball bearings. The second member bored with the N longitudinal holes is located at respective positions corresponding to attachment positions of the N attachment shafts on the first member, each of the N longitudinal holes has a vertical length not shorter than a vertical travel range of the first member. The N attachment shafts are each passed through a corresponding one of the longitudinal holes in such a manner that the second member is put between the pluralities of ball bearings. Thus, the first member is attached to the second member so as to be movable with respect thereto.

As described above, the present invention can provide a lens shift mechanism that enables vertical movement of the lens. In particular, a lens shift mechanism can be provided that is preferably applied to a projector for digital cinema.

DETAILED DESCRIPTION OF THE PREFERRED EMBODIMENTS

Embodiments of the present invention will be described below. The correspondence relationship between constituent elements described in claims and specific examples described in the specification and drawings is as below. This description is for confirming that specific examples supporting the invention described in the claims are described in the specification and drawings. There may be a specific example which is described in the specification and drawings but not described as one corresponding to a constituent element. However, this does not means such a specific example does not correspond to the constituent element. In contrast, there may be a specific element which is described herein as one corresponding to a constituent element. However, this does not mean such a specific example does not correspond to a constituent element other than the constituent element as above.

Further, this description does not mean that the invention corresponding to a specific example described in the specification and drawings is described in all claims. In other words, this description does not deny the presence of the invention that corresponds to a specific example described in the specification and drawings but is not described in the claims of this application, namely, the presence of the invention that will be filed as a divisional application or added by amendment in the future.

According to an embodiment of the present invention, a lens shift mechanism (e.g. a lens mechanism 1 in FIG. 1) enables vertical movement of a lens (e.g. a lens 2 in FIG. 1) attached to a first member (e.g. a lens bracket 12 in FIGS. 1, 2 and others) by attaching the first member to a second member (e.g. a front plate 13 in FIGS. 1, 2 and others) so as to be vertically movable with respect thereto.

Figure 4:
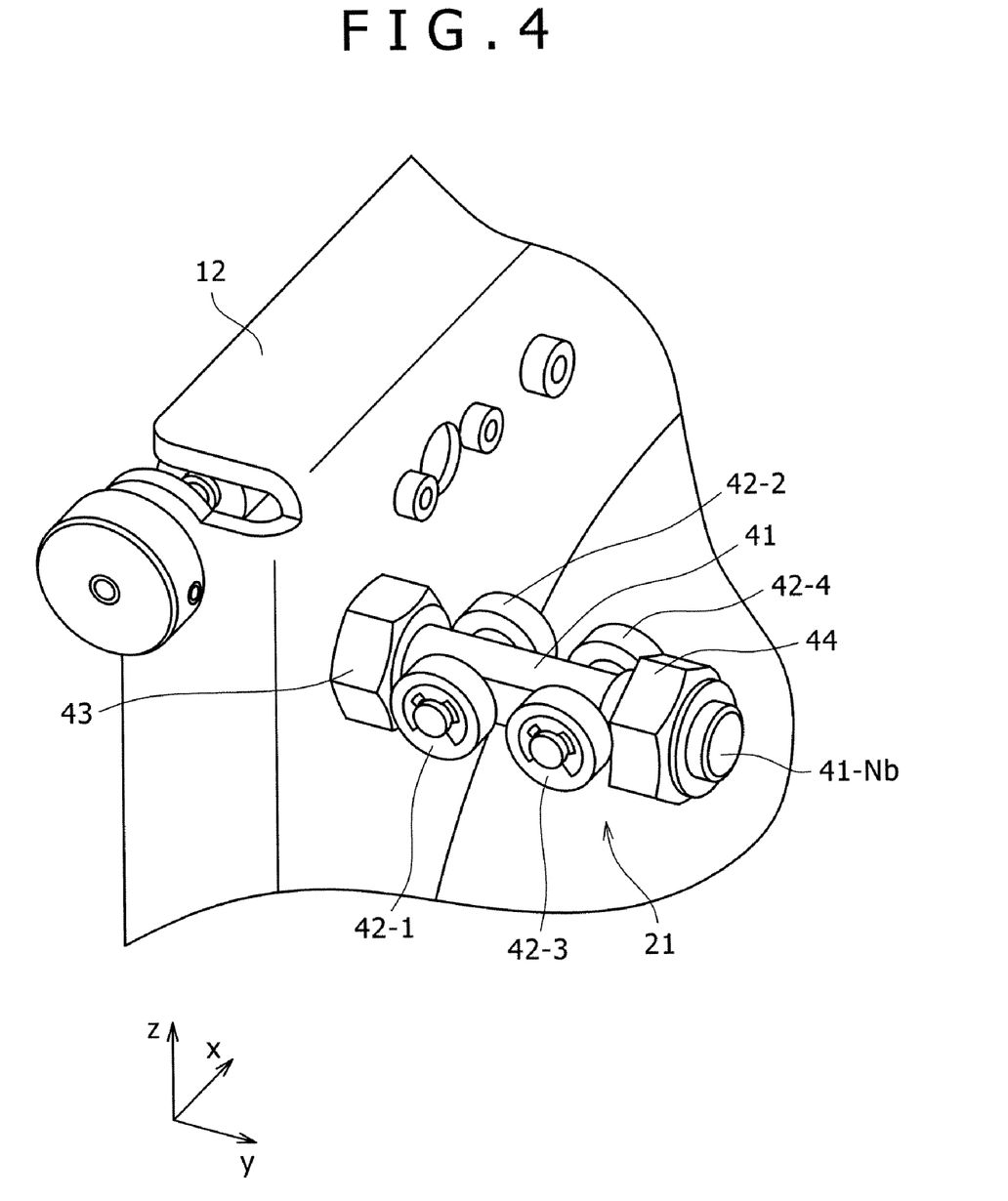
FIG. 4 is a perspective view illustrating a configurational view of an attachment shaft attached to a lens bracket of the lens shift mechanism in FIG. 1.
Figure 5:
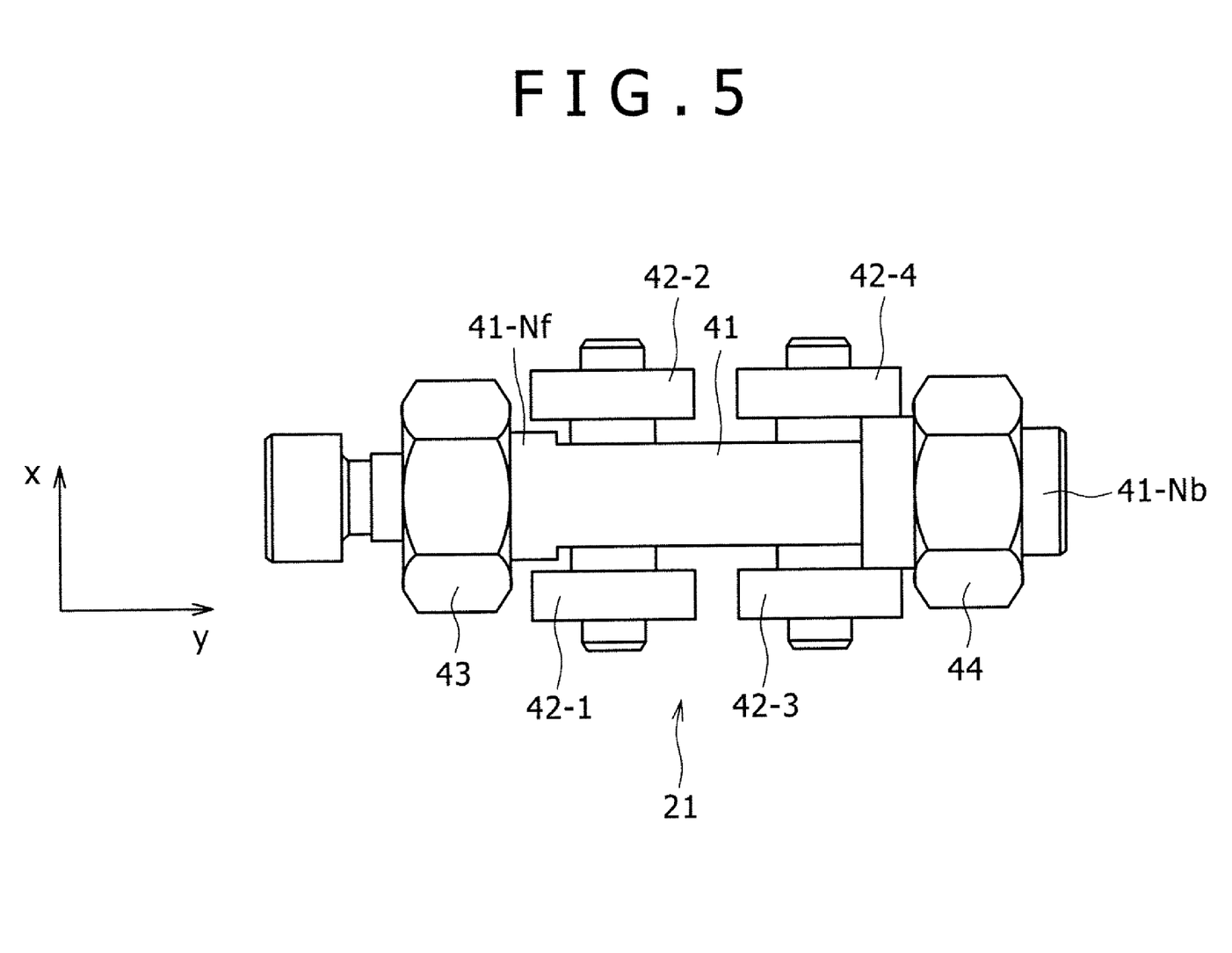
FIG. 5 is a plan view illustrating the configurational example of the attachment shaft removed from the lens bracket of the lens shift mechanism in FIG. 1.

In the lens shift mechanism, (as shown in e.g. FIG. 7) the first member is attached with N (an integer of three or more) attachment shafts each having a plurality of ball bearings (e.g. four ball bearings 42-1 through 42-4 shown in FIGS. 4, 5 and others).

Figure 8:
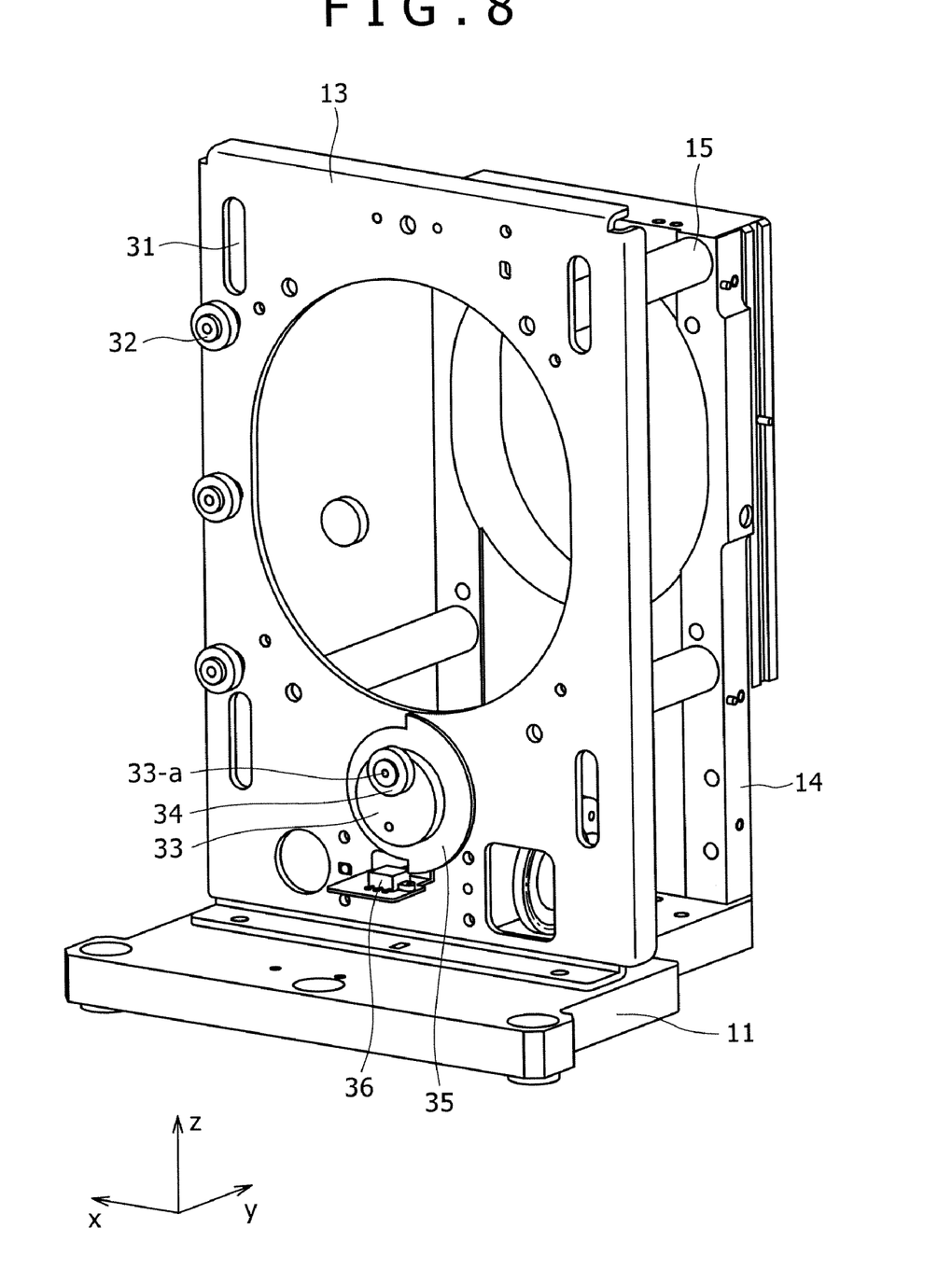
FIG. 8 is a perspective view illustrating a configurational example of a front surface of a front plate in the lens shift mechanism of FIG. 1.

The second member is bored with N longitudinal holes located at respective positions corresponding to attachment positions of the N attachment shafts on the first member (for example, bored with four longitudinal holes 31 as shown in FIG. 8), each of the N longitudinal holes having a vertical length not shorter than a vertical travel range of the first member.

Figure 2:
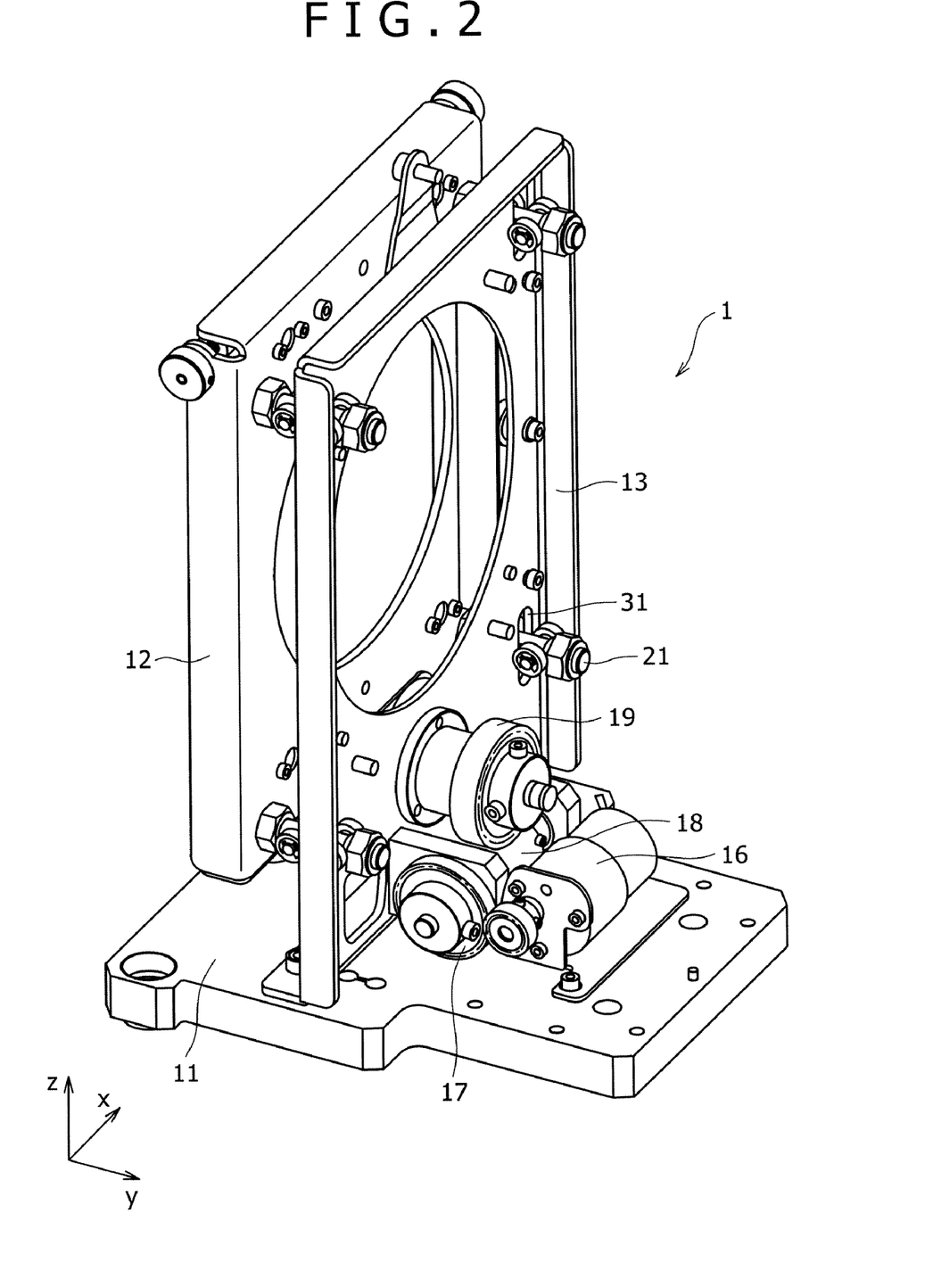
FIG. 2 is a perspective view illustrating the configurational example of the lens shift mechanism with a lens, a back plate and four connecting rods removed from that of FIG. 1.
Figure 3:
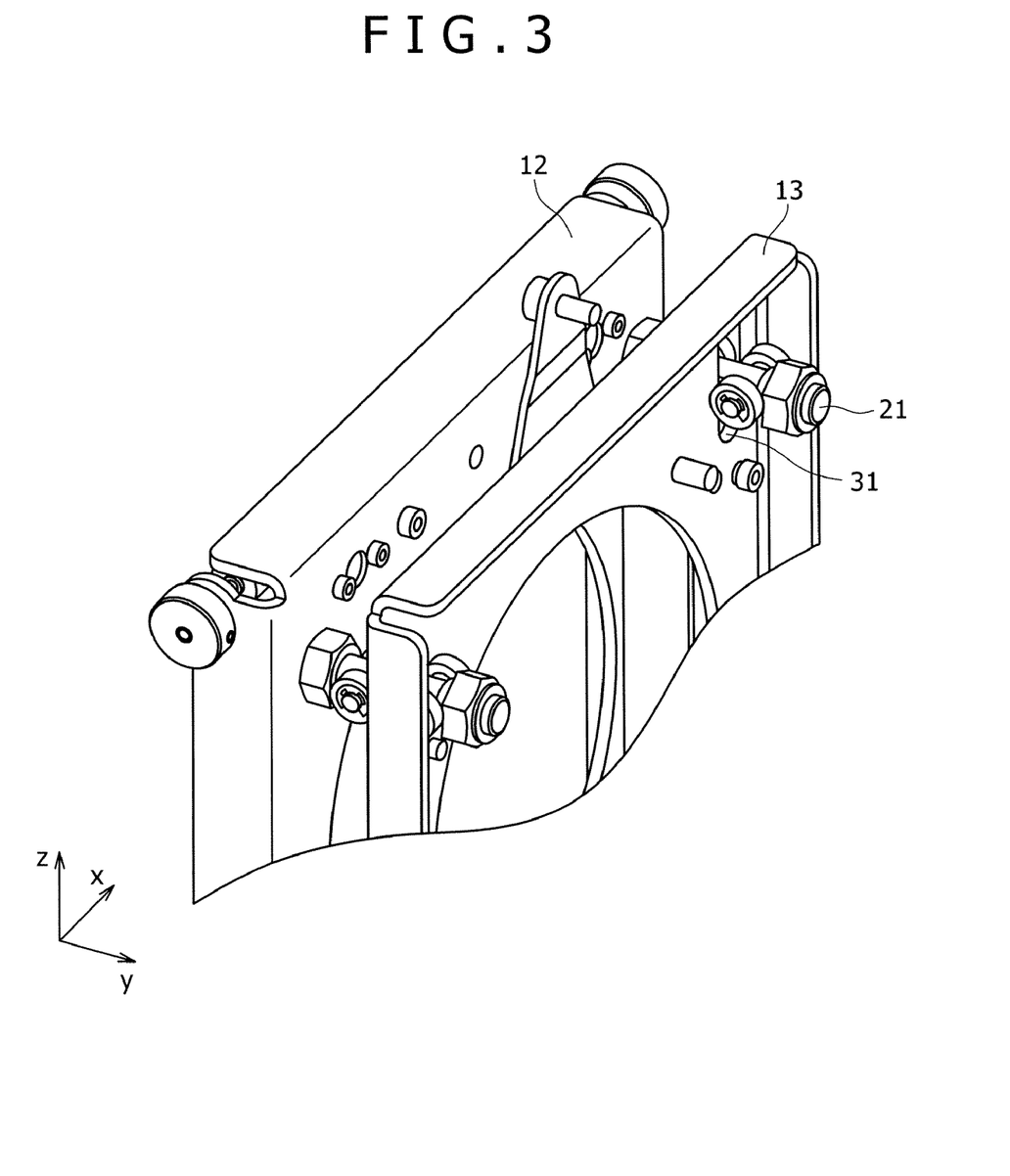
FIG. 3 is an enlarged view of the upper portion of FIG. 2.

The N attachment shafts are each passed through a corresponding one of the longitudinal holes in such a manner that the second member is put between the pluralities of ball bearings possessed by themselves, whereby the first member is attached to the second member so as to be vertically movable with respect thereto. (For example, as shown in FIGS. 2 and 3, a center shaft 41 is passed through a longitudinal hole 31 of the front plate 13 in such a manner that the front plate 13 is sandwiched between a pair of ball bearings 42-1, 42-2 and a pair of ball bearings 42-3, 42-4 at its front surface and rear surface, respectively. A nut 44 is engaged with a threaded portion 41-Nb. Thus, the lens bracket 12 attached with the attachment shafts 21 is attached to the front plate 13.)

Figure 6:
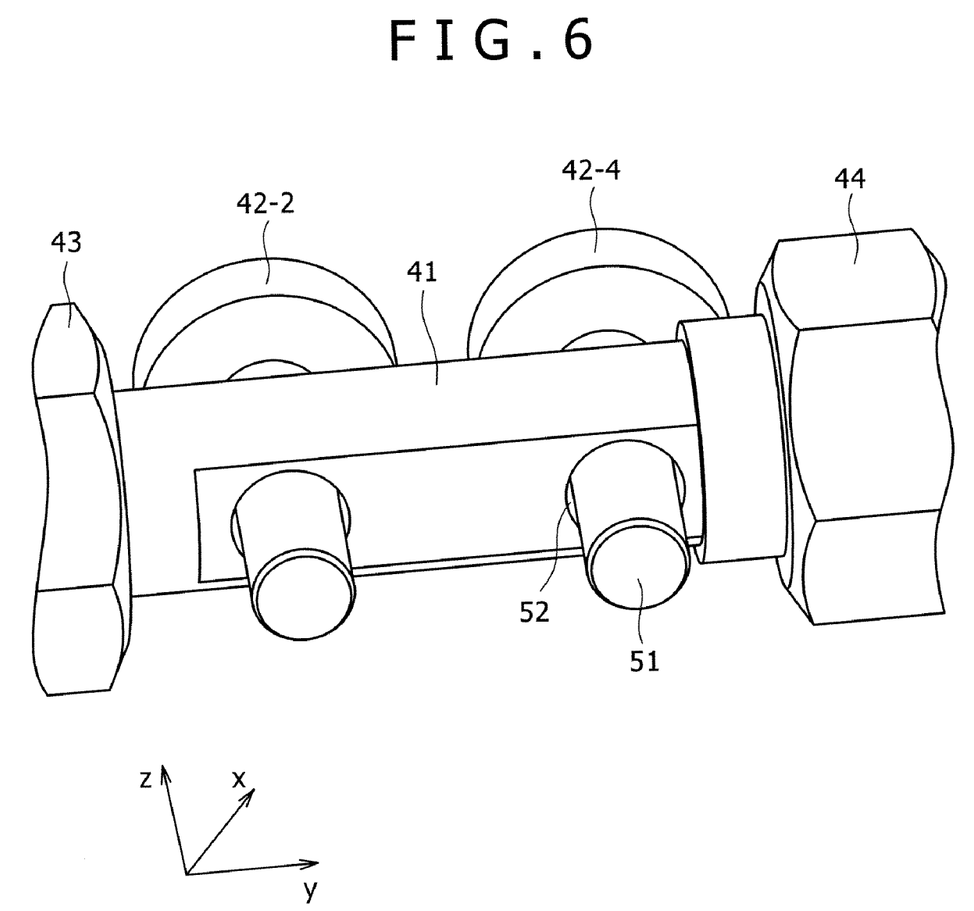
FIG. 6 is a perspective view of the configurational example of the attachment shaft with the two ball bearings removed from the lens shift mechanism of FIG. 1.

The attachment shaft is provided with a screw thread (e.g. a threaded portion 41-Nb of FIG. 5) at an end thereof outside of the longitudinal hole and attached to the second member by the screw thread and a nut (e.g. the nut 44 of FIG. 5) (as shown in e.g. FIG. 2 and FIG. 3) and at least one of the ball bearings can be varied in anteroposterior position by the degree of fastening the nut (for example, in the structure shown in FIG. 6, the anteroposterior (the direction of the y-axis) position of the ball bearings 42-3, 42-4 attached to a shaft 51 passing through a hole 52 is varied by the degree of fastening the nut 44).

The second member is provided with a plurality of other ball bearings (e.g. three ball bearings 32 in FIG. 8).

The first member is attached with a rail member (e.g. a lateral restriction guide rail 22 in FIG. 7) so that the plurality of ball bearings of the second member can be moved vertically and restricted to move laterally, and the plurality of ball bearings of the second member can be moved vertically when the first member is attached so as to be movable with respect to the second member.

Embodiments of the present invention will hereinafter be described with reference to the drawings.

Figure 1:
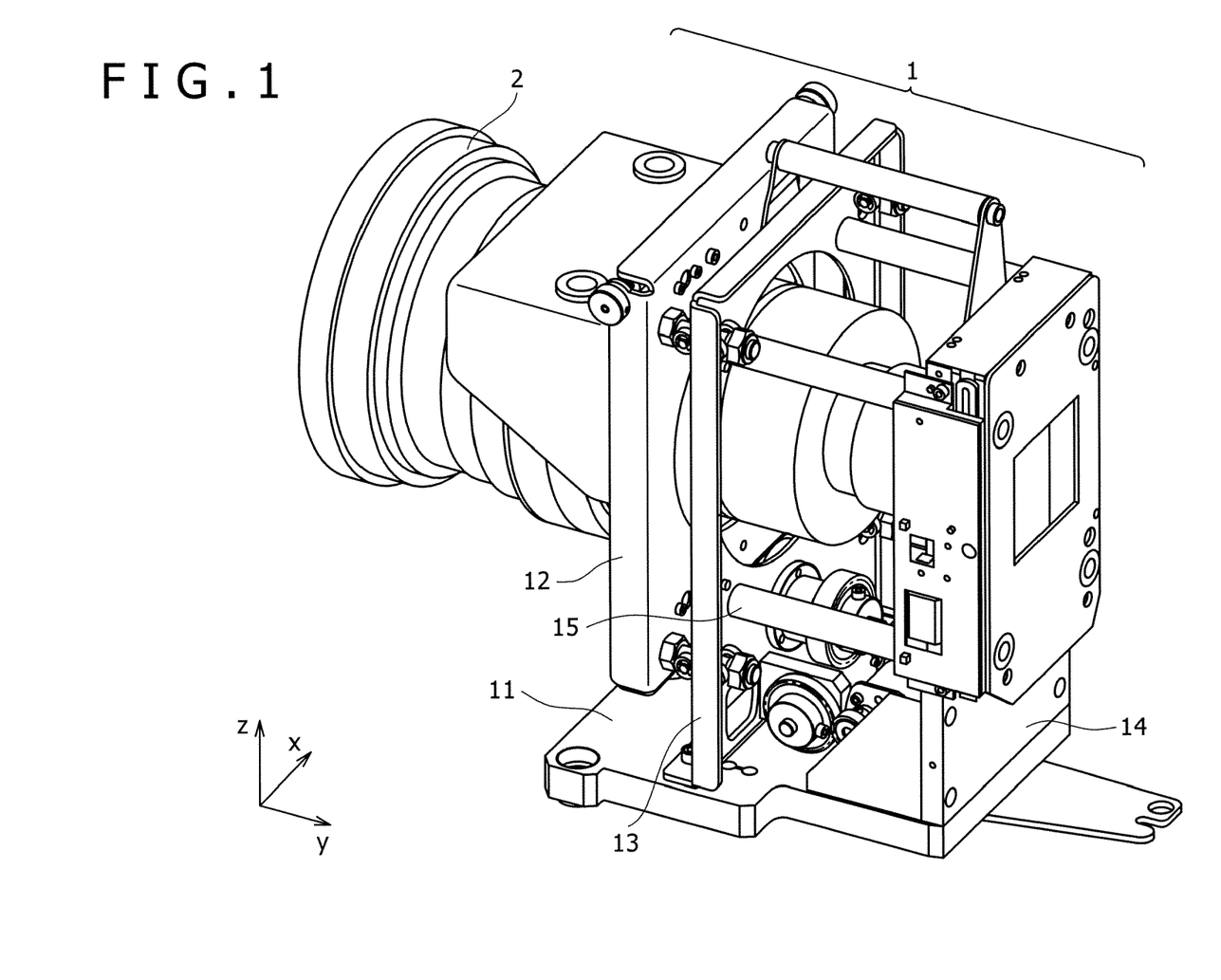
FIG. 1 is a perspective view illustrating a configurational example of a lens shift mechanism according to an embodiment of the present invention.

FIG. 1 is a perspective view illustrating a configuration of an embodiment of a lens shift mechanism according to an embodiment of the present invention.

Referring to FIG. 1, a lens shift mechanism 1 is attached with a lens 2 for digital cinema. In other words, the lens sift mechanism 1 and the lens 2 are each provided as a constituent element of a projector for digital cinema. Although not shown, an image is projected on a screen by this projector. It is necessary to move the lens 2 vertically in order to adjust the vertical positions of the image projected on the screen. To meet the necessity, the lens shift mechanism 1 is provided in the embodiment to move the lens 2 vertically.

There are drawn x-, y-, and z-axes in FIG. 1. The lens 2 is moved vertically, that is, in the direction of z-axis among the x-, y-, and z-axes. Hereinafter, the positive direction (the direction of an arrow) of the z-axis refers arbitrarily to the upside direction. A direction opposite to this direction, namely, the negative direction of the z-axis refers arbitrarily to the underside direction. The negative direction of the y-axis, namely, the projecting direction of the lens 2 refers arbitrarily to the front direction. A direction opposite to this direction, namely, the positive direction of the y-axis refers arbitrarily to the rear direction. Along with the designations, a surface of each member as viewed in a direction toward the downside from the upside (the negative direction of the z-axis) refers to an upper surface. A surface of each member as viewed in a direction toward the upside from the downside (the positive direction of the z-axis) refers to a lower surface. A surface of each member as viewed in a direction toward the rear from the front (the positive direction of the y-axis) refers to the front surface. A surface of each member as viewed toward the front from the rear (the negative direction of the y-axis) refers to the rear surface. These designations are also used in the descriptions with other drawings in the same manner.

The lens shift mechanism 1 includes an installation base 11, a lens bracket 12, a front plate 13, a back plate 14 and connection rods 15.

The installation base 11 is disposed perpendicularly to the vertical direction, that is, parallel to an x-y plane. The back plate 14 and the front plate 13 are fixedly arranged on the upper surface of the installation base 11 in order from the right in FIG. 1 so as to be spaced apart from each other in parallel to the vertical direction (the direction of the z-axis).

The rear surface of the front plate 13 is connected to the front surface of the back plate 14 through the four connection rods 15 parallel to the back and forth direction (the direction of the y-axis). This increases the rigidity of the lens shift mechanism 1.

Because of for digital cinema, the lens 2 is large and heavy. Specifically, for example, a small, lightweight lens having an aperture of about 30 to about 40 mm is used as a household lens, whereas a large, heavy lens having an aperture of about 170 mm and a weight of about 10 to 20 kg is used as the lens 2 for digital cinema. For this reason, the lens shift mechanism 1 needs increased rigidity so that various measures are tried to increase the rigidity. One of the measures is to provide the four connecting rods 15.

Other measures to increase the rigidity, for example, measures such as four-point support of the attachment shafts 21 (see FIG. 2 and other figures) are detailed later.

As described above, the installation base 11, the front plate 13 and the back plate 14 are fixed and not driven or moved if the projector is installed in the cinema theater.

On the other hand, the lens bracket 12 is a lens attachment member for the lens 2 and is mounted to the front plate 13 which is a fixing member so as to be moved in the vertical direction (the direction of the z-axis along with the lens 2.

The lens bracket 12 and the front plate 13 are further detailed below.

FIG. 2 is a perspective view illustrating the configurational example of the lens shift mechanism 1 with the lens 2, the back plate 14 and the four connecting rods 15 removed from that of FIG. 1. FIG. 3 is an enlarged view illustrating the upper portion of the lens shift mechanism 1 in FIG. 2.

Referring to FIG. 2, the lens shift mechanism 1 further includes a motor 16, a gear 17 and a worm gear 18 which are provided on the upper surface of the installation base 11. A worm wheel 19 is provided on the worm gear 18. The lens bracket 12 is vertically moved by such members. In other words, as described later with FIG. 9, each of such members is a constituent element of the drive mechanism for vertically moving the lens bracket 12 vertically. Such a drive mechanism is detailed with reference to FIGS. 9 through 12.

The front plate 13 is bored with holes 31 located at the upper left, the upper right, lower left and the lower right as viewed from the front surface (as viewed from the positive direction of the y-axis). Each of the holes 31 is long in the vertical direction (the direction of the z-axis) and short in the horizontal direction (the direction of the x-axis). The holes 31 are hereinafter referred as the longitudinal holes 31. On the other hand, the lens bracket 12 is provided on its rear surface with attachment shafts 21 located at the upper left, the upper right, the lower left and the lower right as viewed from the front surface.

As shown in FIGS. 2 and 3, the four attachment shafts 21 are each inserted into and attached to a corresponding one of the four longitudinal holes 31, so that the lens bracket 12 is mounted to the front plate 13 so as to be movable vertically. In other words, the lens bracket 12 is mounted to the front plate 13 by four-point support of the attachment shafts 21. In this case, the four attachment shafts 21 can be moved vertically freely in the range of the vertical length of the longitudinal hole 31. Consequently, the lens bracket 12 can vertically be movable in the range of the vertical length of the longitudinal hole 31. In other words, the longitudinal hole 31 needs only to have a vertical length not shorter than the travel range of the lens bracket 12, e.g., to have a length equal to or greater than the range from the lowermost position L to the uppermost position H in FIG. 11 described later.

The attachment shaft 21 is further detailed below with reference to FIGS. 4 through 6.

FIG. 4 is a perspective view illustrating a configurational view of the attachment shaft 21 attached to the upper right on the rear surface of the lens bracket 12 as viewed from the front surface side, i.e., as viewed in the positive direction of the y-axis. FIG. 5 is a plan view illustrating the configurational example of the attachment shaft 21 removed from the lens bracket 12.

Referring to FIGS. 4 and 5, the attachment shaft 21 is configured to include a center shaft 41, four ball bearings (wheels) 42-1 through 42-4, a nut 43 and a nut 44. The center shaft 41 is formed with a threaded portion 41-Nf and with a threaded portion 41-Nb. The nut 43 is engaged with the threaded portion 41-Nf and the nut 44 is engaged with the threaded portion 41-Nb. Four ball bearings (wheels) 42-1 through 42-4 are provided between the threaded portion 41-Nf and the threaded portion 41-Nb, namely, at the central portion of the center shaft 41. More specifically, in the central portion of the center shaft 41 the ball bearings 42-1, 42-2 are provided close to the threaded portion 41-Nf (on the front side) so as to be symmetrical as viewed from above and the ball bearings 42-3, 42-4 are provided close to the threaded portion 41-Nb (on the rear side) so as to be symmetrical as viewed from above.

As shown in FIG. 4, the attachment shaft 21 is attached to the rear surface of the lens bracket 12 by the treaded portion 41-Nf and the nut 43.

As clearly from FIGS. 2 and 3, the center shaft 41 is passed through the longitudinal hole 31 in such a manner that the front plate 13 is sandwiched at its front surface and rear surface by a pair of the ball bearings 42-1, 42-2 and a pair of ball bearings 42-3, 42-4, respectively. Then, the nut 44 is screwed onto the threaded portion 41-Nb from the rear surface side of the front plate 13. Thus, the attachment shaft 21 is attached to front plate 13. In other words, the four attachment shafts 21 are each attached to the front plate 13 so that the lens bracket 12 is attached to the front plate 13 so as to be vertically movable.

In this case, changing the degree of fastening the nut 44 can finely adjust the position of the pair of ball bearings 42-3, 42-4 in the back and forth direction (the longitudinal direction of the center shaft 41; the direction of the y-axis). The four attachment shafts 21 can individually be subjected to this fine adjustment. Its accuracy is not greater than several tens μm necessary for focusing of the digital cinema lens 2. Thus, the attachment of the lens bracket 12 to the front plate 13, namely, the assembly adjustment of the back and forth direction of the lens 2 can simply be performed while maintaining the accuracy necessary for digital cinema.

The principle of the fine adjustment is as below. Referring to FIG. 6, a shaft 51 passes through a hole 52 bored in the center shaft 41 and the ball bearing 42-3 (not shown in FIG. 6) and the ball bearing 42-4 are attached to the shaft 51 so as to sandwich the center shaft 41 therebetween. The center shaft 41 is formed such that a diameter of the hole 52 in the back and forth direction (the lengthwise direction of the center shaft 41; the direction of the y-axis) is greater than the diameter of the shaft 51. Thus, the shaft 51, that is, the pair of ball bearings 42-3, 42-4 can freely be moved in the back and forth direction within the range of the diameter of the hole 52. The nut 44 is provided as a member to move the shaft in the back and forth direction.

As the nut 44 is tightened, the nut 44 itself is moved forward (the negative direction of the y-axis), namely, toward the direction of the pair of the ball bearings 42-3, 42-4 as viewed from the nut 44. Along with the forward movement of the nut 44, also the pair of ball bearings 42-3, 42-4 attached to the shaft 51 move forward. In contrast, as the nut 44 is loosened, the nut 44 itself is moved rearward (the positive direction of the y-axis), namely, in a direction opposite to the pair of ball bearings 42-3, 42-4 as viewed from the nut 44. Along with the rearward movement of the nut 44, the pair of ball bearings 42-3, 42-4 attached to the shaft 51 moves rearward.

In this way, the attachment of the lens bracket 12 to the front plate 13 is realized by inserting each of the four attachment shafts 21 on the side of the lens bracket 12 into a corresponding one the four longitudinal holes 31 on the side of the front plate 13. However, only such attachment merely brings the lens bracket 12 into an up and down movable state. Additionally, it is necessary to provide members adapted to actually move the lens bracket 12 vertically, members adapted to prevent backlash of the lens bracket 12 during vertical movement, and other members for the lens bracket 12 and front plate 13. Such members are hereinafter described with reference to FIGS. 7 and 8 by way of example.

Figure 7:
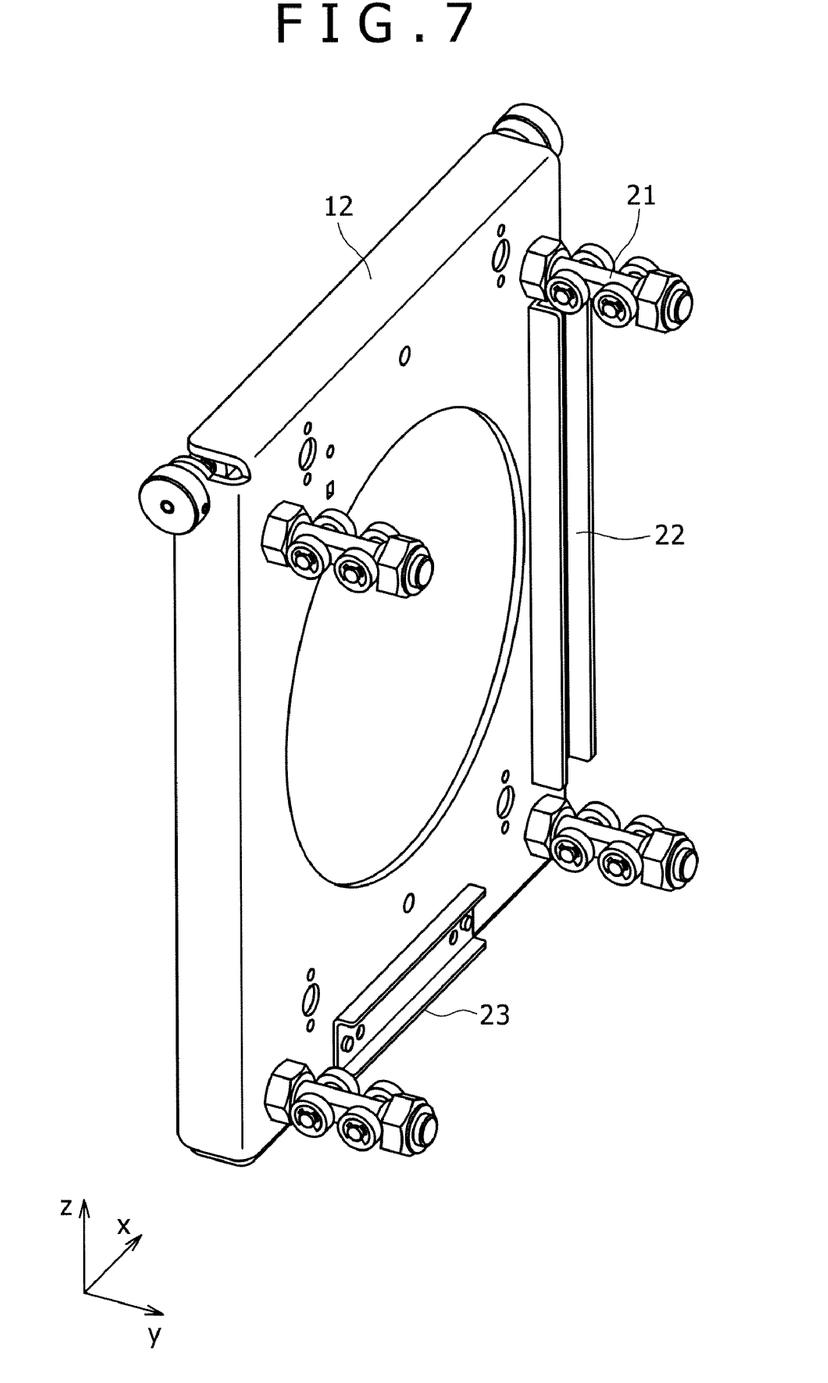
FIG. 7 is a perspective view illustrating a configurational example of a rear surface of the lens bracket in the lens shift mechanism of FIG. 1.

FIG. 7 is a perspective view illustrating a configurational example of a rear surface of the lens bracket 12. FIG. 8 is a perspective view illustrating a configurational example of a front surface of the front plate 13. In the embodiment shown FIG. 8, the front plate 13 is secured to the installation base 11 along with the back plate 14.

Referring to FIG. 7, a left-right restriction guide rail 22 is provided between the attachment shafts 21 located at the upper right and lower right as viewed from the rear surface side (as viewed from the negative direction of the y-axis) on the rear surface of the lens bracket 12 in addition to the four attachment shafts 21 described above. A vertical drive guide rail 23 is provided between the attachment shafts 21 located between the lower left and the lower right.

Referring to FIG. 8, the front plate 13 is provided on its front surface with three ball bearings 32 between the longitudinal holes 31 located at the upper left and the lower left as viewed from the front surface side (as viewed from the positive direction of the y-axis). In other words, the three ball bearings 32 are provided at a position corresponding to the position of the left-right restriction guide rail 22 on the lens bracket 12. In addition, a rotary plate 33 having an eccentric shaft 33-a, a ball bearing 34 fitted to the eccentric shaft 33, a switch kick plate 35 and a limiter switch 36 are provided between the longitudinal holes 31 located at the lower left and lower right, in other words, at a position corresponding to the vertical drive guide rail 23 of the lens bracket 12.

The rear surface of the lens bracket 12 of FIG. 7 and the front surface of the front plate 13 of FIG. 8 configured described above are opposed to each other and the four attachment shafts 21 are each inserted into a corresponding one of the longitudinal holes 31 for attachment. Thus, the lens bracket 12 is attached to the front plate 13 so as be vertically movable with respective thereto as illustrated in FIG. 2 and other figures.

In this case, the three ball bearings 32 of FIG. 8 are disposed in the left-right restriction guide rail 22 and the ball bearing 34 fitted to the eccentric shaft 33-a of FIG. 8 is disposed in the vertical drive guide rail 23.

In this way, the three ball bearings 32 of FIG. 8 can freely moved in the left-right restriction guide rail 22 vertically (the direction of the z-axis) while it is restricted to move horizontally (the direction of the x-axis) by the left-right restriction guide rail 22. Consequently, when the lens bracket 12 is vertically moved by a drive mechanism described later with FIG. 9 and other figures, there is very little backlash in the horizontal direction. In other words, each of the three ball bearings 32 of FIG. 8 and the left-right restriction guide rail 22 of FIG. 7 is one of members to prevent backlash during the vertical movement of the lens bracket 12.

The ball bearing 34 fitted to the eccentric shaft 33-a of FIG. 8 can freely move in the horizontal direction (the direction of the x-axis) in the vertical drive guide rail 23 of FIG. 7, while it is restricted to move vertically (the direction of the z-axis) by the vertical drive guide rail 23. The vertical drive guide rail 23 is secured to the lens bracket 12 which is movable vertically. This means the following. When the ball bearing 34 fitted to the eccentric shaft 33-a of FIG. 8 moves vertically, the vertical drive guide rail 23 moves vertically and the lens bracket 12 secured with the vertical drive guide rail 23 moves vertically.

Although details are described later with reference to FIGS. 9 through 12, when the rotary plate 33 of FIG. 8 is turned, the vertical position of the eccentric shaft 33-a is moved to move the lens bracket 12 vertically.

Each of the rotary plate 33 having the eccentric shaft 33-a fitted to the ball bearing 34 of FIG. 8 and the vertical drive guide rail 23 which guides the movement of the ball bearing 34 is one of members to actually move the lens bracket 12 vertically.

Figure 12:
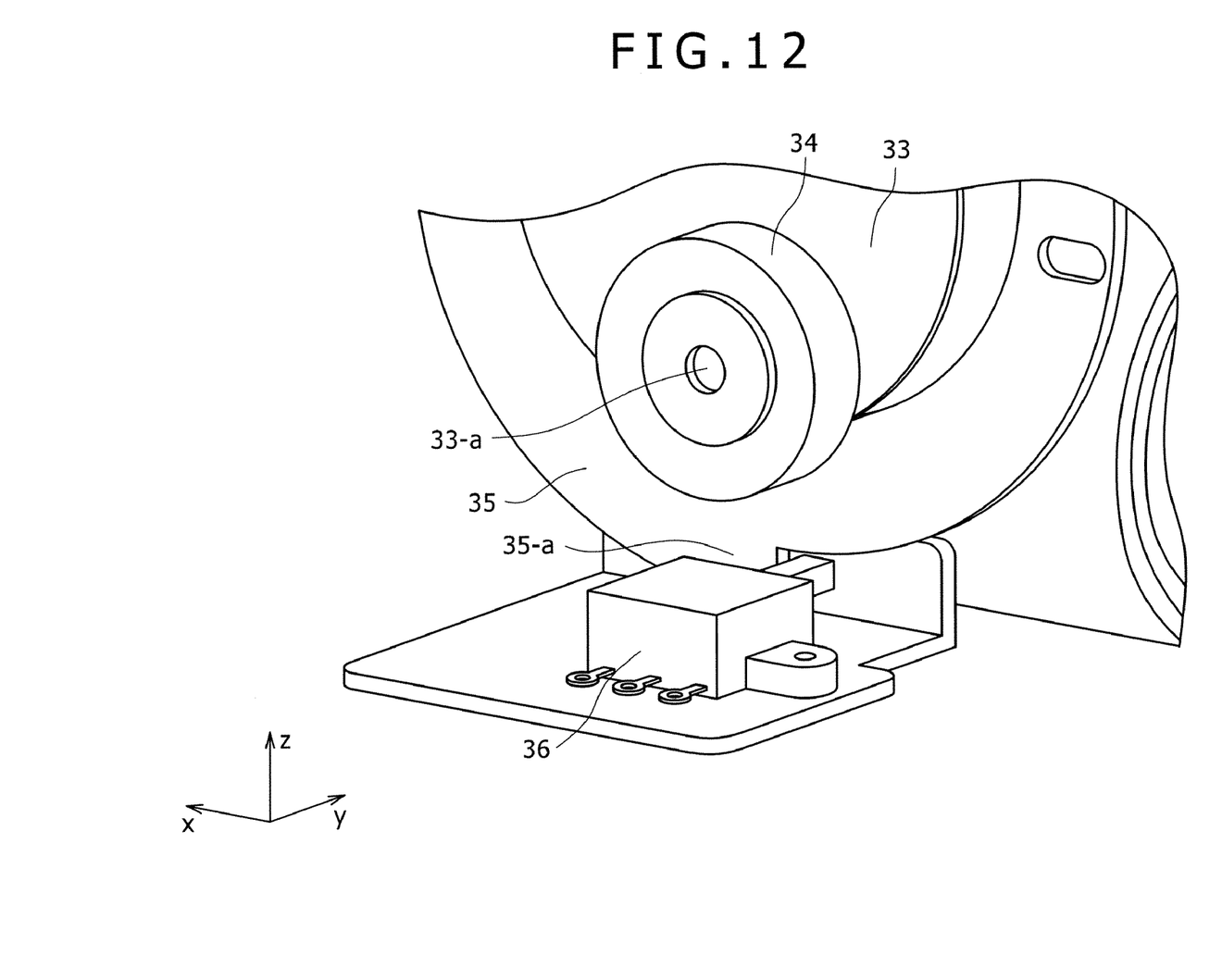
FIG. 12 is a perspective view illustrating a configurational view of a switch kick plate and a limiter switch in the lens shift mechanism of FIG. 1.

The functions of the switch kick plate 35 and the limiter switch 36 are described later with reference to FIG. 12. Each of the rotary plate 33 having the eccentric shaft 33-a fitted to the ball bearing 34 of FIG. 8, the switch kick plate 35 and the limiter switch 36 is one of constituent elements of a drive mechanism for vertically moving the lens bracket 12.

Figure 9:
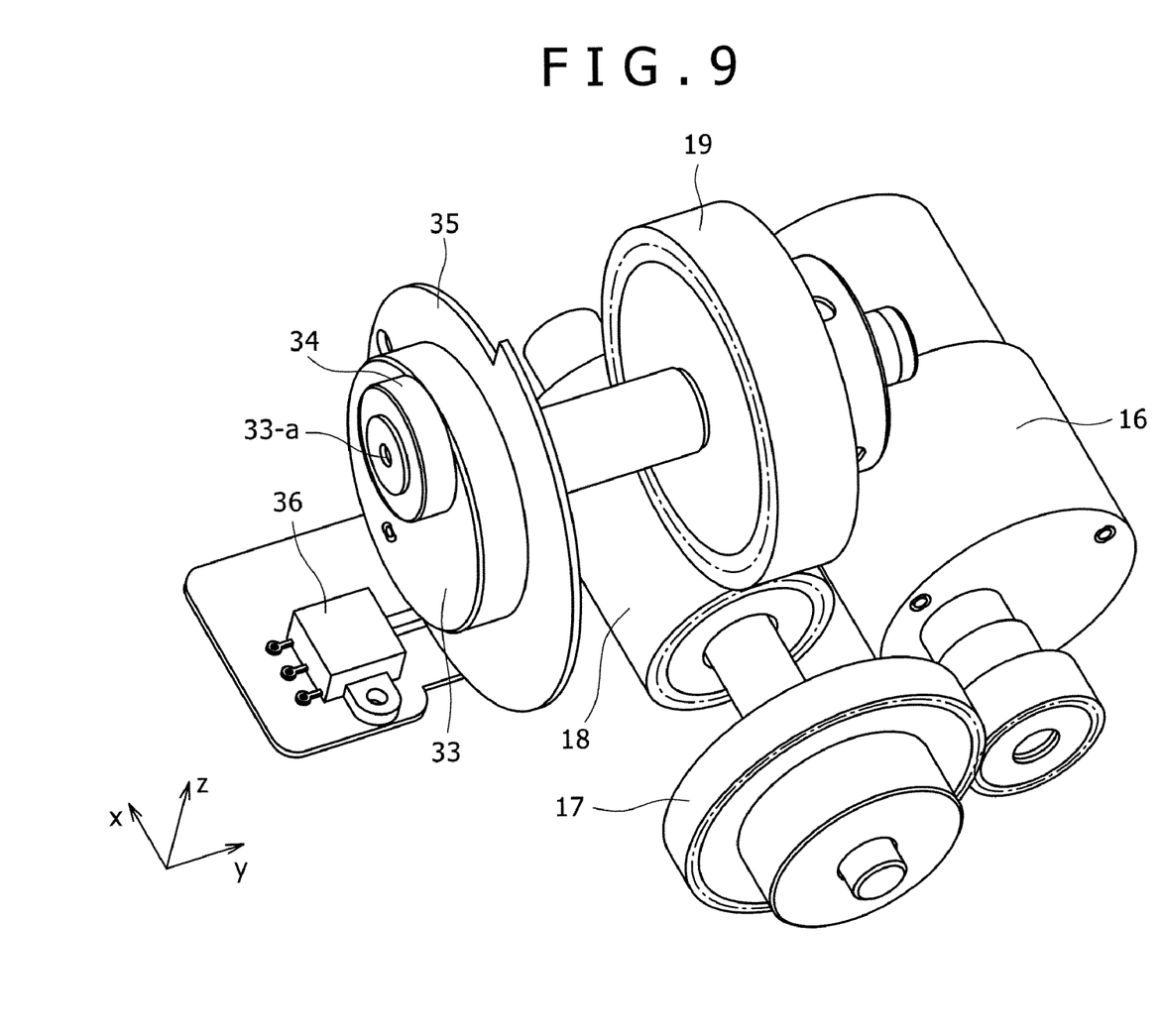
FIG. 9 is a perspective view illustrating a configurational example of a drive mechanism for vertically driving the lens bracket in the lens shift mechanism of FIG. 1.

FIG. 9 is a perspective view illustrating a configurational example of the drive mechanism for vertically moving the lens bracket 12.

Referring to FIG. 9, the drive mechanism is such that a motor 16 and a worm gear 18 are installed on the front surface of the installation base 11 (see FIG. 2, etc.) not shown in FIG. 9 and in rear of the front plate 13 not shown in FIG. 9 so as to be parallel to the horizontal direction (the direction of the x-axis). A shaft of the motor 16 meshes with a gear 17 carried on the shaft of the worm gear 18. A worm wheel 19 is disposed on the worm gear 18 (the direction of the z-axis) so as to mesh therewith. The worm wheel 19, and the switch kick plate 35 and the rotary plate 33 are centrally secured to the shaft 20 so as to put the front plate 13 therebetween from the front and rear surfaces thereof, respectively (see FIGS. 2 and 8). The limiter switch 36 is provided below the switch kick plate 35.

The operation of the drive mechanism is as below. Along with rotation of the shaft of the motor 16 on a y-z plane, the rotary plate 33 is turned on an x-z plane through the gear 17, the worm gear 18 and the worm wheel 19. This causes the eccentric shaft 33-a to circularly move around the center of the rotary plate 33, whereby the vertical (the direction of the z-axis) position of the eccentric shaft is varied.

Incidentally, the switch kick plate 35 and the limiter switch 36 are described later with reference to FIG. 12.

Figure 10:
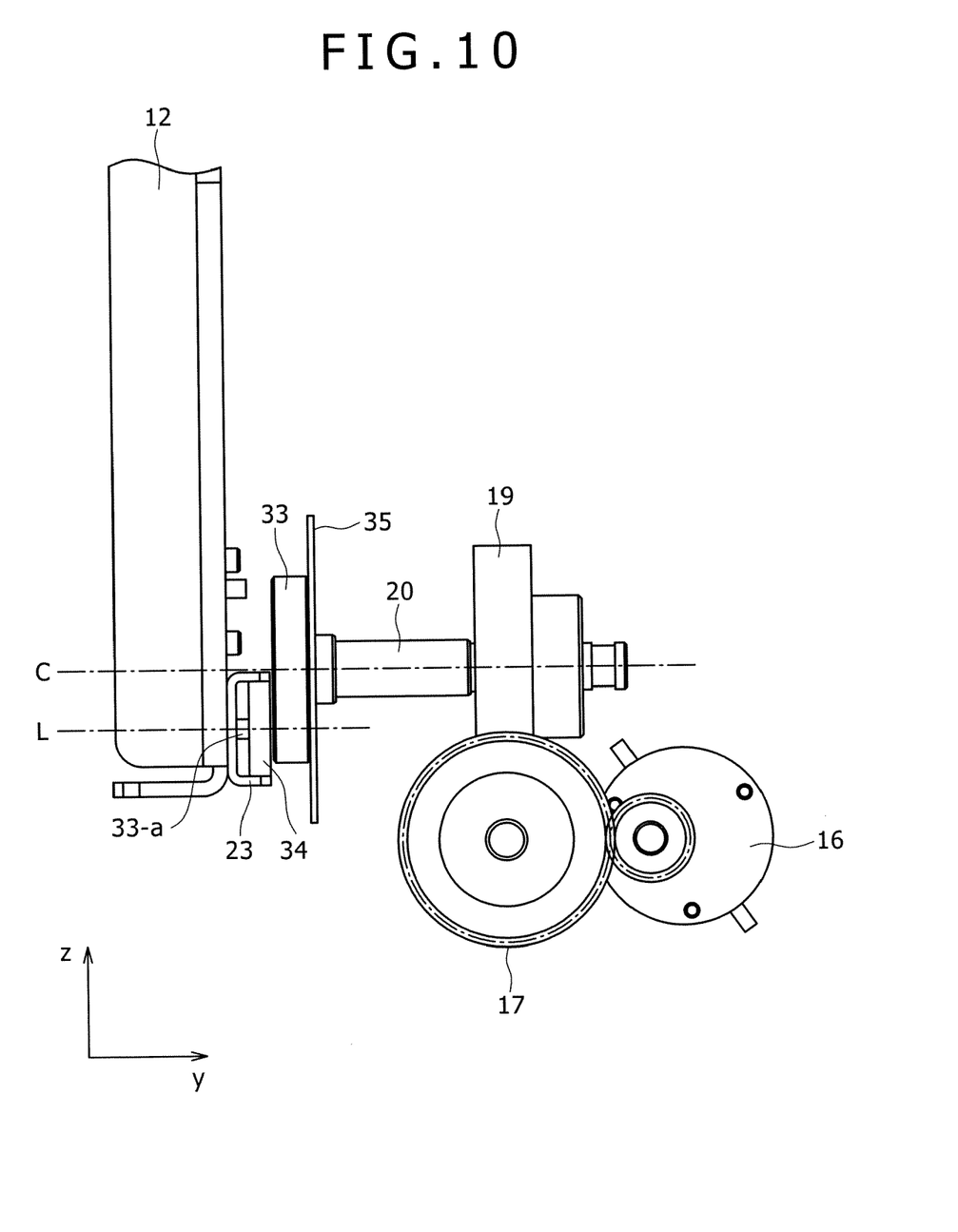
FIG. 10 is a diagram for assistance in explaining vertical movement of the lens bracket, in which the lens bracket exists at the lowermost position.
Figure 11:
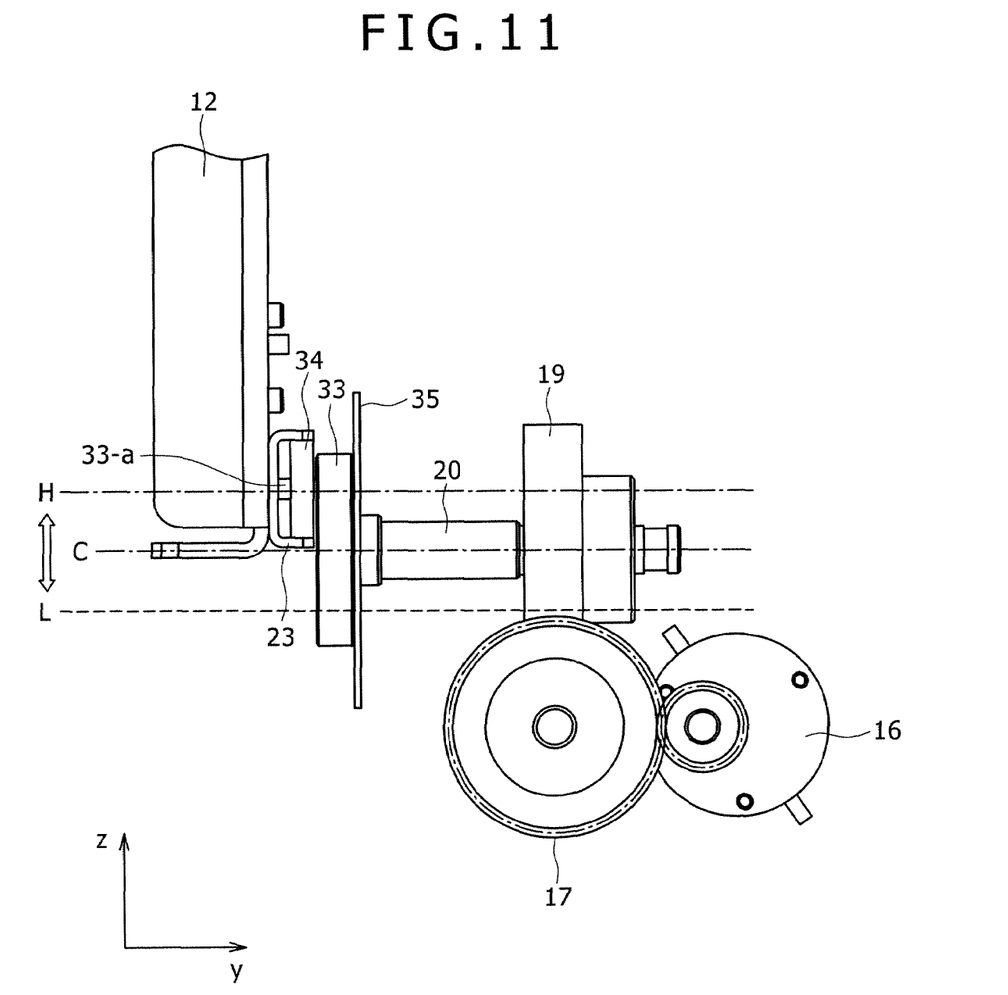
FIG. 11 is a diagram for assistance in explaining vertical movement of the lens bracket, in which the lens bracket exists at the uppermost position.

Such operation of the drive mechanism allows the lens bracket 12 to be moved vertically as shown in FIGS. 10 and 11.

As described above, the ball bearing 34 fitted to the eccentric shaft 33-a is disposed to restrict the vertical movement in the vertical drive guide rail 23. The vertical drive guide rail 23 is secured to the lens bracket 12. Thus, when the ball bearing 34 fitted to the eccentric shaft 33-a is moved vertically, also the lens bracket 12 is moved vertically along with the movement of the ball bearing 34.

In this case, as the motor 16 turns, the eccentric shaft 33-a is moved vertically between the lowermost position L shown in FIG. 10 and the uppermost position H shown in FIG. 11 with the position C shown FIGS. 10 and 11 taken as a central position C. Thus, also the lens bracket 12 is moved vertically within a range corresponding to the range between the lowermost position L and the uppermost position H shown in FIG. 11.

That is to say, the vertical position of the lens bracket 12 corresponds to the rotational angle of the motor 16. The rotational angle of the motor 16, i.e., the vertical position of the lens bracket 12 can freely be adjusted by control of a motor driver and a controller, etc. not shown. In other words, if the lens bracket 12 is moved vertically, it is only necessary to exercise control to turn the motor correspondingly to such a travel distance.

It should be noted that members (mainly the front plate 13) with which the lens bracket 12 is in contact include only the ball bearings 42-1 to 42-4 of the attachment shaft 21, the three ball bearings 32 on the side of the front plate 13 and the ball bearing 34 fitted to the eccentric shaft 33-a of the rotary plate 33. In other words, the vertical movement of the lens bracket 12 is subjected to only rolling friction and not subjected to sliding friction. Thus, the lens 2 (see FIG. 1) attached to the lens bracket 12 can vertically be moved without backlash stably and accurately as compared with the existing lens vertical drive mechanism using a screw and nut.

As described above, the three ball bearings 32 on the front plate 13 are disposed to restrict the lateral movement in the left-right restriction guide rail 22. Therefore, also lateral backlash encountered during the vertical movement of the lens bracket 12 can substantially be eliminated.

When the vertical movement of the lens bracket 12 is completed, that is, the rotation of the motor 16 is stopped, the so-called self-lock function possessed by the worm gear 18 and worm wheel 19 maintains the vertical position of the lens bracket 12 without change.

The motor 16 may keep turning without stop due to its rotation control trouble. Even in such a case, the ball bearing 34 fitted to the eccentric shaft 33-a of FIG. 8 is laterally reciprocated in the vertical drive guide rail 23 of FIG. 7 with the result that the lens bracket 12 is vertically reciprocated only. Specifically, in an existing lens shift mechanism, a lens attachment member (which corresponds to the lens bracket 12 of the present embodiment) may vertically be moved to a travel limit and thereafter a motor may keep turning. In such a case, there arises a problem in that the motor undergoes an excessive load to be burned. In contrast, in the lens shift mechanism 1 of the present embodiment, even if the motor 16 keeps turning, the lens bracket 12 is only vertically reciprocated in the predetermined travel range. In other words, in view of the mechanism, the lens bracket 12 will not travel in excess of the predetermined travel range upwardly or downwardly; therefore, the motor will not undergo an excessive load so that such a problem will not occur.

As described above, the lens shift mechanism 1 according to the embodiment of the present invention is applied to the projector for digital cinema. Therefore, the various problems that occur when the existing lens shift mechanism is intactly applied to the projector for digital cinema, that is, the various problems described in the paragraph of "Summary of the Invention", can be solved or such problems themselves will not arise. In this way, it is preferable that the lens shift mechanism 1 according to the embodiment of the present invention be applied to one for digital cinema.

Incidentally, the fact itself that the motor 16 keeps turning is an abnormal phenomenon. To stop the abnormal phenomenon when it occurs, the switch kick plate 35 and the limiter switch 36 are provided as shown in FIG. 12.

The switch kick plate 35 has a claw 35-a adapted to kick the limiter switch 36. When the claw 35-a kicks the limiter switch 36, the limiter switch 36 operates to come into an on-state from an off-state, thereby forcibly stopping the turning of the motor 16. In other words, the fact that the switching state of the limiter switch 36 comes into the on-state from the off-state is one condition to issue a turn stop instruction of the motor 16.

It is to be noted that the number of and the attachment positions for the claws 35-a are not restrictive. As easily seen from FIGS. 10 and 11, when the lens bracket 12 moves from the lowermost position to the uppermost position, that is, the eccentric shaft 33-a of the rotary plate 33 moves from the lowermost position L to the uppermost position H, or vice versa, the rotary plate 33 turns at 180 degrees. The claw 35-a is then provided to detect the rotational angle of the rotary plate 33 at 0 or 180 degrees. In other words, the claw 35-a is configured to kick the limiter switch 36 when the rotational angle of the rotary plate 33 is 0 or 180 degrees.

As describe above, the function of the switch kick plate 35 and limiter switch 36 is to stop the turning of the motor 16 when the rotational angle of the rotary plate 33 reaches a limit angle (0 or 180 degrees in the example mentioned above), or to operate as assistance in stopping the turning of the motor 16. In other words, if there is provided such a member, it is not necessary to particularly adopt the switch kick plate 35 and limiter switch 36. Specifically, a limit member which limits the rotational angle of the rotary plate 33 at a predetermined limit angle may be adopted instead of the switch kick plate 35, and a detection mechanism which detects the rotational angle of the rotary plate 33 reaching the limit angle may be adopted instead of the limiter switch 36.

The lens shift mechanism 1 shown in FIGS. 1 through 12 has been described as an embodiment of a lens shift mechanism embodying the present invention. However, the present invention is not limited to the lens shift mechanism 1 and can take various embodiments.

Although not shown, a detector which detects a rotational angle of the rotary plate 33, specifically, e.g. a potentiometer, is further provided. This makes it possible to provide the vertical position of the lens bracket 12 for the user during the vertical shift adjustment of the lens bracket 12. Specifically, it is possible to display the vertical position on a predetermined screen or to output an audio-message indicating the vertical position.

After the adjustment, it is further possible to retain, as an adjustment value, the value of the potentiometer at the time of the adjustment in a memory not shown. Video contents projectable on a screen are of great variety. Movie pictures are classified broadly into various types different in aspect from each other, e.g., into "Cine-scope" and "Vista". The lens bracket 12 needs the vertical shift adjustment for each type. When the projector is installed in a movie theater and various adjustments are first performed, the vertical shift adjustment of the lens bracket is performed for each of "Cine-scope" and "Vista" and their adjustment values are retained in the memory. Thereafter, when it becomes necessary to switch from one of "Cine-scope" and "Vista" to the other during a movie, the position of vertical shift can easily be varied, without the necessity of another vertical shift adjustment, only by inputting the adjustment values retained in the memory.

As described above, the vertical shift adjustment of the lens bracket 12 can basically be performed only by performing the turning control of the motor 16. For example, although not shown, a remote controller is prepared to instruct the turning control of the motor 16. A user can perform the vertical shift adjustment on the lens bracket 12 by operating the remote controller from a place remote from the installation position of the projector mounted with the lens shift mechanism, e.g., near the screen. Further, various functions requisite for other adjustments, e.g., the focusing function of the lens 2 are mounted on the remote controller as well as the function requisite for the vertical shift adjustment. This enables further simplified adjustment.

The drive mechanism for performing the vertical shift of the lens bracket 12 is not limited to the example of FIG. 9. Although not shown, a drive mechanism for manually vertical-shifting the lens bracket 12 may be adopted.

The embodiment described above adopts the four attachment shafts 21 as a member for attaching the lens bracket 12 which is a lens attachment member for the lens 2 to the front plate 13 which is a fixing member. However, the number of the attachment shafts 21 is not limited to four, it is arbitrary.

A spacer has been adopted as a member for attaching the lens attachment member to the fixing member. The adjustment by this spacer is difficult and four-point adjustment may be substantially impossible. In other words, the existing lens shift mechanism can perform only up to three-point adjustment as anteroposterior fine adjustment of the lens by the spacer. Thus, the existing lens shift mechanism has low rigidity and the anteroposterior assembly adjustment of the lens is difficult.

In contrast, in the lens shift mechanism 1 of the present embodiment, the adjustment is simply performed by turning the bolts. Since the simply configured attachment shafts 21 are adopted, the four-point adjustment that has been almost impossible and furthermore multiple-point adjustment can be enabled easily. As a result, the lens shift mechanism 1 is increased in rigidity and assembly adjustment can be performed easily and accurately. Since the attachment shaft 21 is configured simply and the fixing member side needs only to be bored with the longitudinal holes 31 (see FIG. 8 and other figures), the cost can be more reduced ever before.

It should be understood by those skilled in the art that various modifications, combinations, sub-combinations and alterations may occur depending on design requirements and other factor in so far as they are within the scope of the appended claims or the equivalents thereof.

What is claimed is:

1. A lens shift mechanism which enables vertical movement of a lens attached to a first member by attaching the first member to a second stationary member so as to be vertically movable with respect to the second member, comprising:

N (an integer of three or more) attachment shafts each having a plurality of ball bearings and attached to the first member; and the second member bored with N longitudinal holes located at respective positions corresponding to attachment positions of the N attachment shafts on the first member, each of the N longitudinal holes having a vertical length not shorter than a vertical travel range of the first member;

wherein the N attachment shafts are each passed through a corresponding one of the longitudinal holes in such a manner that the second member is put between the pluralities of ball bearings, whereby the first member is attached to the second member so as to be vertically movable with respect to the second member.

2. The lens shift mechanism according to claim 1, wherein the attachment shaft is provided with a screw thread at an end of the attachment shaft outside of the longitudinal hole and attached to the second member by the screw thread and a nut and at least one of the ball bearings can be varied in anteroposterior position by the degree of fastening the nut.

3. The lens shift mechanism according to claim 1, wherein the second member is provided with a plurality of other ball bearings, and the first member is attached with a rail member so that the plurality of ball bearings of the second member can be moved vertically and restricted to move laterally, the plurality of ball bearings of the second member being disposed on the rail member when the first member is attached to the second member so as to be vertically movable.

4. A lens shift method for a lens shift mechanism which enables vertical movement of a lens attached to a first member by attaching the first member to a second stationary member so as to be vertically movable with respect to the second member, and which includes N (an integer of three or more) attachment shafts each having a plurality of ball bearings and attached to the first member, and the second member bored with N longitudinal holes located at respective positions corresponding to attachment positions of the N attachment shafts on the first member, each of the N longitudinal holes having a vertical length not shorter than a vertical travel range of the first member, the method comprising:

passing each of the N attachment shafts through a corresponding one of the longitudinal holes; and attaching the second member so as to be put between the pluralities of ball bearings, whereby the first member is vertically moved with respect to the second member.

5. A projector which enables vertical movement of a lens attached to a first member by attaching the first member to a stationary second member so as to be vertically movable with respect to the second member, comprising:

N (an integer of three or more) attachment shafts each having a plurality of ball bearings and attached to the first member; and the second member bored with N longitudinal holes located at respective positions corresponding to attachment positions of the N attachment shafts on the first member, each of the N longitudinal holes having a vertical length not shorter than a vertical travel range of the first member;

wherein the N attachment shafts are each passed through a corresponding one of the longitudinal holes in such a manner that the second member is put between the pluralities of ball bearings, whereby the first member is attached to the second member so as to be vertically movable with respect to the second member for adjusting vertical positions of an image on a screen.

* * * * *